United States Patent Office 2,727,435
Patented Dec. 20, 1955

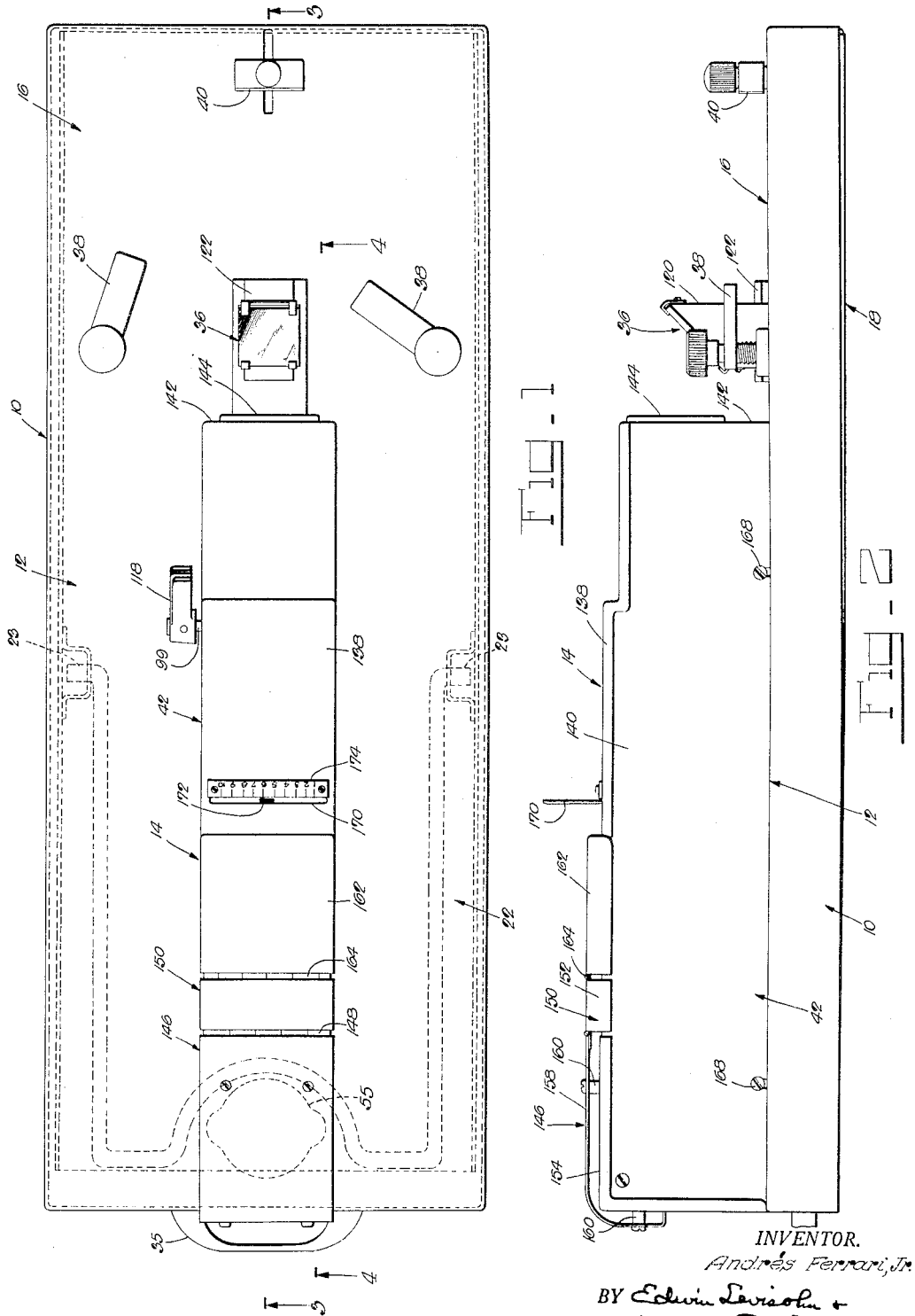

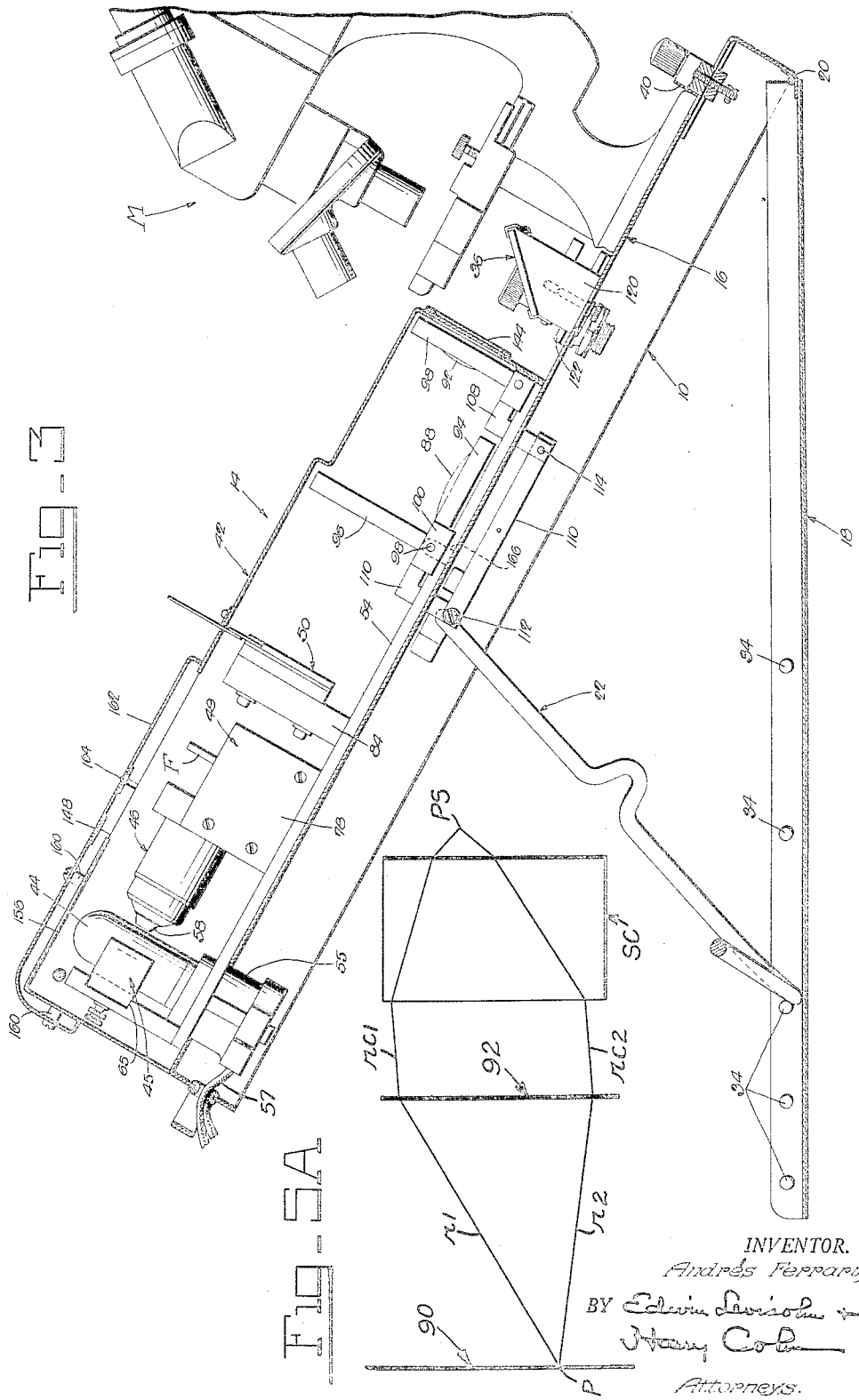

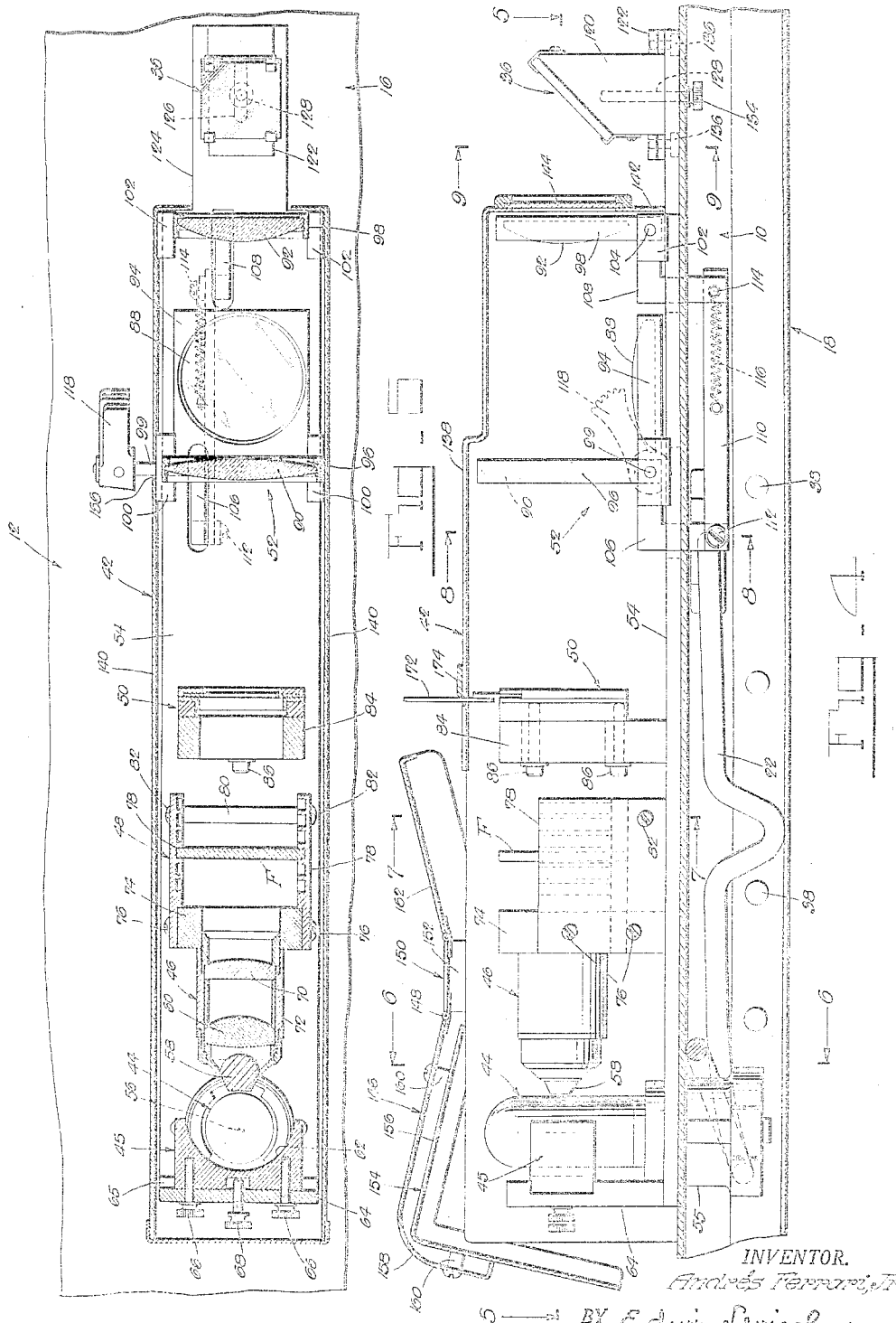

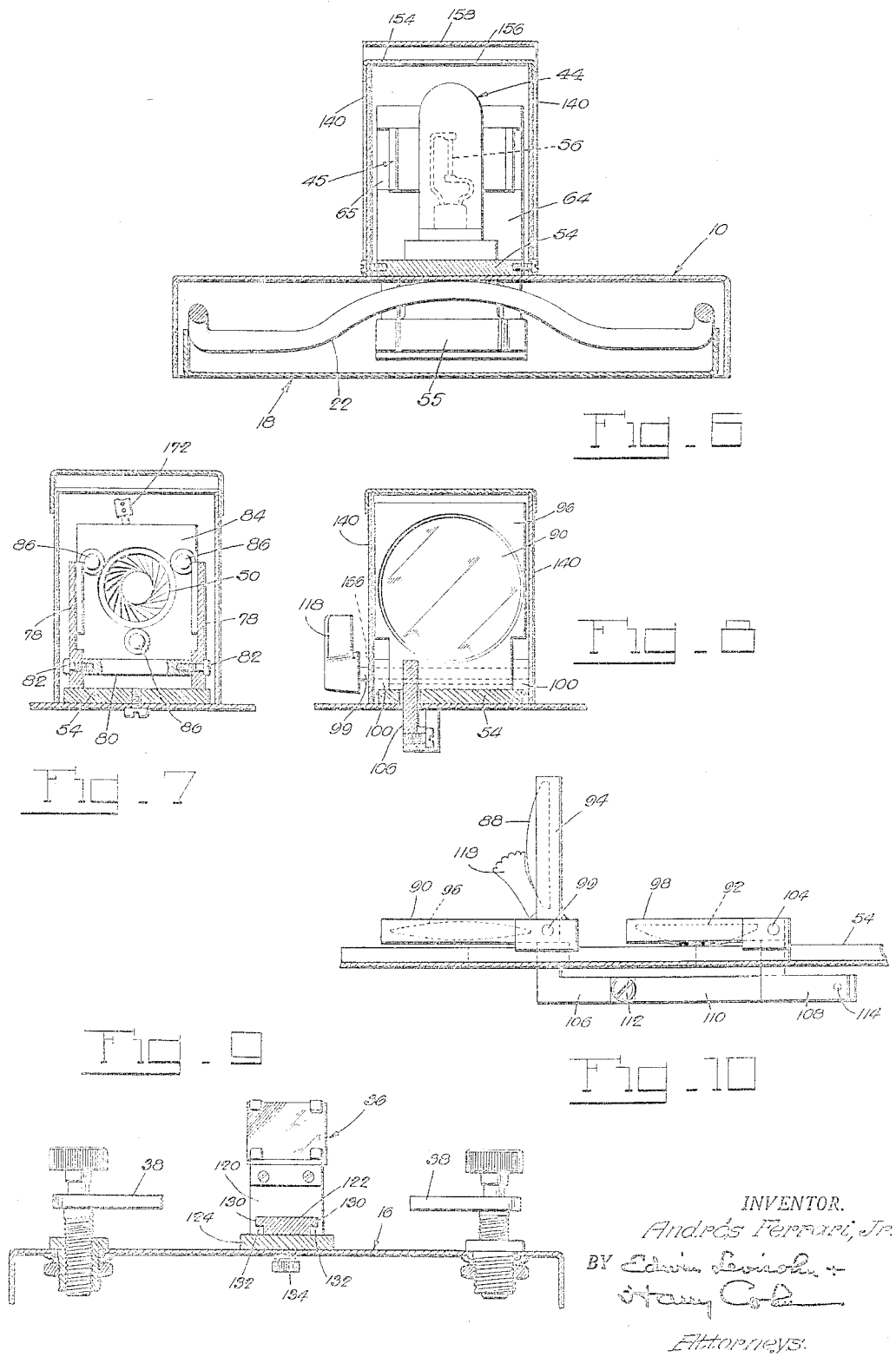

2,727,435

MICROSCOPE ILLUMINATORS

Andrés Ferrari, Jr., Uniondale, N. Y., assignor, by mesne assignments, to Scopicon, Inc., Chauncey, N. Y., a corporation of New York Substituted for abandoned application Serial No. 173,372, July 12, 1950. This application November 6, 1950, Serial No. 194,320

5 Claims. (Cl. 88—40)

The present invention relates to microscope illuminators.

One object of the invention is to provide a microscope illuminator which is capable of completely and evenly illuminating the higher power objective lenses of the microscope and which is also capable of properly illuminating a relatively large area of the object for examination thereof through the objectives of the lower and lowest powers of the microscope without requiring re-adjustment of the microscope condenser.

Another object is to provide a microscope illuminator which is of such character as to produce in conjunction with the sub-stage condenser of the microscope a comparatively large numerical aperture of illumination at the stage of the microscope.

Another object is to provide a microscope illuminator wherein provision is made for eliminating the unevenness of illumination of an irregular shaped, e. g. coiled, filament of an incandescent electric lamp when such a lamp is used as the light source.

A further object is the provision of a microscope illuminator wherein the source of light and the optical system are arranged and mounted in definite relation on a base which also has a part for supporting the microscope in correct relation to the illuminator on the base and wherein provision is made to compensate for variations in the height of the microscope stage in different microscopes and for normal variations in focal lengths of sub-stage condensers, so that any microscope can be secured in position and at the same time maintain the distances required for critical focusing for all usual powers of the microscope.

A yet further object is generally to provide an improved illuminator for microscopes.

The above and other objects, features and advantages of the present invention will be more fully understood from the following description considered in connection with the accompanying illustrative drawings.

In the drawings:

Fig. 1 is a top plan view of a microscope illuminator embodying the present invention;

Fig. 2 is a side view thereof;

Fig. 3 is a sectional view on the line 3—3 of Fig. 1, showing the microscope mounted on the base and showing also the base in inclined position;

Fig. 4 is a longitudinal sectional view, on a larger scale, on the line 4—4 of Fig. 1;

Fig. 5 is a sectional view on the line 5—5 of Fig. 4;

Fig. 5A is diagrammatic illustration of the path of light through certain parts of the illuminator to the stage of the microscope, some of the elements of the illuminator and microscope being omitted for the sake of clearness of the illustration;

Figs. 6, 7, 8 and 9 are sectional views on the lines 6—6, 7—7, 8—8 and 9—9, respectively, of Fig. 4;

Fig. 10 is a side view of part of the illuminator showing certain of the lenses of the optical system positioned differently than in Figs. 3, 4 and 5.

Referring now to the drawings in detail, the microscope illuminator of the present invention comprises a base 10 here shown as having a part 12 on which the illuminator 14 is mounted and a part 16 on which to mount a microscope indicated at M in Fig. 3. As illustrated in Fig. 3, the base 10 is pivotally mounted on a frame 18 so that the base 10 can be supported in various inclined positions as described for example in U. S. application Serial No. 109,346, filed by me and George Gorham, as joint inventors, on August 9, 1949, and assigned to the assignee of the present application. It is to be understood, however, that in regard to certain aspects of the present invention, the latter is independent of the tiltable mounting of the base 10. The pivot for base 10 on frame 18 is indicated at 20, and it will be understood that the base 10 is releasably held in any one of a series of inclined positions of different angles by means of the bracket 22 which is pivotally secured to base 10 as indicated at 23 in Fig. 1 and is engageable with the longitudinally spaced cross pins 34, substantially as described in the above mentioned application. A handle 35 is fixed to the movable end of base 10 for convenience in raising and lowering the latter in positioning the base in relation to frame 18.

The illuminator of the present invention is intended especially for use with high quality microscopes known as research microscopes which are provided with Abbe or other type sub-stage condensers which are aplanatic and in some cases achromatic as well. However, in the use of the illuminator, the usual sub-stage mirror or reflector is removed from the microscope, the said illuminator being provided with a reflector 36 over which the microscope stage is positioned, as illustrated in Fig. 3, the surface of said reflector being at 45° to the incident light path so as to reflect the light from the illuminator at an angle of 90° to direct the optical axis into coincidence with the optical axis of the microscope. The adjustable screw operated clamps 38 are provided for engagement with the base of the microscope for securing the latter in correct position in relation to reflector 36, and an adjustable abutment 40 is provided on the base 10 for engagement with the heel of the microscope base, all as described in detail in the above mentioned application Serial No. 109,346.

The illuminator 14 is normally enclosed within a housing 42 hereinafter more specifically described, and comprises an electric lamp 44, as the source of light, and an optical system including a concave reflector 45, a first lens device 46, a light filter mount 48, an adjustable iris field-diaphragm 50, and a second lens device 52 in addition to the above mentioned 90° light-reflector 36. All of said elements are assembled in proper relation, in optical bench fashion, on a rigid flat plate 54 which is fixedly secured to the part 12 of the base 10.

The lamp 44, as illustrated, is of the pre-focused, straight-ribbon filament type, but any other type of lamp, including the coiled filament lamp, heretofore employed in microscope lamps may be used in the present illuminator. The socket 55 for said lamp is secured to base 10 and projecting to the underside thereof where the electric cord 57 is connected thereto. The lamp 44 and its socket 55 are arranged so that the wider face of the filament 56 of the lamp extends vertically and confronts, and is parallel to the adjacent flat planar surface of the lens 58 of the first lens device 46. Said lens 58 and a companion lens 60 constitute the elements of an Abbe-like condenser. As here shown, the reflector 45 is in the form of a metal block having the cylindrical reflecting surface 62 mounted with its axis at right angles to the optical axis of lens device 46. Said block is adjustably mounted on member 64, in a groove 65, by means of screws 66 and 68 for movement toward and away from the lamp filament 56 for adjusting the position of said reflector in relation to said filament when necessary as when one lamp 44 is replaced by another.

The lens 58 and reflector 45 are positioned in relation to each other and to the light source provided by the filament 56 of lamp 44 so as to provide at the front or light receiving side of said lens 58 a much larger numerical aperture of illumination than that of the lens as measured from said light source itself. It is to be noted moreover that the front planar surface of lens 58 is illuminated directly by light from filament 56 and also has focused thereon an enlarged image of said filament. As the glass envelope of lamp 44 is cylindrical, a cylindrical reflector 45 is employed, enabling the reflector and lamp to be disposed conveniently in relatively close relation in order to provide a larger numerical aperture of illumination than would be the case if a spherical surface reflector were utilized with a lamp having a cylindrical envelope. However, when the lamp has a spherical or generally spherical envelope, the reflector could, so far as the feature of a large numerical aperture of illumination is concerned, be of the spherical surface type since with a generally spherical lamp such spherical surface reflector could be positioned close to the lamp so as to provide the desired increased numerical aperture. However, it is an advantage, pursuant to one aspect of the present invention, to utilize a cylindrical, or one-direction magnifying, reflector in order to eliminate the unevenness of illumination of an irregular shape, e. g. coiled, filament of an incandescent electric lamp when the latter is used instead of the straight-ribbon filament type of the lamp illustrated. In this connection it will be noted that because of the cylindrical reflector each point or increment longitudinally of the filament of the light source is reflected as a line of light on the front surface of lens 58 and the lines formed by the reflections of all of the points or increments which make up the entire reflected part of the filament are superimposed on each other on said surface of lens 58 with the result that the reflected light on said surface is uniform.

The lens device 46 includes also a collecting lens 70, and it will be noted that all of said lenses are mounted in a holder 72 which is carried by the vertical block 74 to which the light-filter mount 48 is secured in any suitable way as by screws 76. As here shown, said mount comprises the plates 78 which are grooved on their internal surfaces (Fig. 5) to removably receive one or more light filters F (Fig. 5). A spacer rod 80 secured between plates 78 by screws 82 completes the construction of said mount 48. The adjustable iris field-diaphragm 50 is mounted on a support 84, being fastened thereto by the screws 86. The aperture of said diaphragm is at the focus of lens 70 so that a real image of the illumination on the front planar surface of lens 58 is focused at the plane of said diaphragm aperture.

Lens device 52 comprises a lens 88, which is shown in retracted or inoperative position in Figs. 3 and 4, and companion lenses 90 and 92 which are shown in operative position, in Figs. 3 and 4, the operative position of lens 88 and the concomitantly inoperative positions of the companion lenses 90 and 92 being illustrated in Fig. 10. Said lenses 88, 90 and 92 are mounted in frames 94, 96 and 98, respectively. The field diaphragm 50 is positioned so that its aperture is equi-distant between lenses 70 and 90, reference being had to the upright or operative position of lens 90 (Fig. 4). Frames 94 and 96 are secured at right angles to each other and the optical axis of lenses 88 and 90 are at right angles to each other; and the optical axis of lens 92 is at right angles to the optical axis of lens 88 and in line with the optical axis of lens 90. Lens frames 94 and 96 are mounted in right angular relation on a shaft 99 which is pivotally mounted in bearing members 100. Lens frame 98 is pivotally mounted in the bearing members 102, by means of the pivot pins 104 which project from the lower sides of said frame 98.

Frame 98 is connected for conjoint movement with frames 94 and 96, and for this purpose an L-shaped arm 106 secured to the bottom of frame 96 is connected to a similar L-shaped arm 108 which is connected to the bottom of frame 98. The connection between arms 106 and 108 comprises a rod 110 pivotally connected at its opposite ends to the outer ends of arms 106 and 108 as indicated at 112 and 114. A tension spring 116 (Fig. 4) connected at its opposite ends to rod 110 and arm 108 serves to prevent lost motion between said rod and arms 106 and 108. A knob 118 is provided on shaft 99 for turning the latter and thereby moving lens 88 and lenses 90 and 92 concomitantly to their operative and inoperative positions.

Referring now again to the reflector 36, it will be noted that said reflector is mounted so that light is deflected from the optical axis of the lens devices 46 and 52 upwardly through the condenser of the microscope in line with the optical axis of the latter. As previously indicated, reflector 36 is adjustable in order to compensate for variations in the height of the microscope stage above the base, so that any microscope can be secured in position and at the same time maintain the distances required for critical focusing for all usual powers. For this purpose the mount 120 for the reflector 36 is movable on part 16 of the base in line with the optical axis of the illuminator toward and away from the light outlet end of the latter. Said adjustability is provided by means of a stationary guide 122 (Figs. 4, 5 and 9) which is secured to an extension 124 of plate 54 and which is provided with a slot 126 in which a tightening screw 128, in threaded engagement with reflector mount 120, is longitudinally movable. It will be noted that mount 120 and guide 122 have interfitting portions 130, 132 so that said mount is movable in relation to said guide only longitudinally of the latter, being held against all other movement. The tightening of the head 134 of the screw 128 against the under surface of base 10 serves to secure reflector mount 120 releasably in adjusted position. It will be noted that as illustrated in Fig. 4 guide 122 is secured to plate extension 124 by screws 136.

The housing 42 for the illuminator includes, in unitary relation, the top 138, the opposite sides 140, a front wall 142 provided with a transparent glass covered window 144. The back and the rear upper portion of the housing is constituted by a pivoted closure device 146 which is hinged at 148 to one side of a bracket 150. The side edges 152 of the latter are spot welded or otherwise suitably secured to the upper edges of side walls 140. Member 146 includes an L-shaped upper and end closure portions 154, the upper part of said closure member 154 having an opening 156 for the escape of heat of lamp 44 from the housing, and a light baffle member 158 is secured to closure member 154 by the screw-spacing members 160. A cover 162 is hinged at 164 to bracket 150 to provide access to the light filter mount 48 for the insertion and removal of the light filters. It will be noted that one of the side walls 140 of the housing 42 is provided with an open bottom slot 166 so that the housing can be removed, without disturbing the parts disposed therein, when the housing fastening screws 168 are loosened. The top 138 of the housing is provided with a lateral slot 170 (Fig. 1) in which the arm 172 for adjusting the opening of the iris diaphragm is movable, and a calibrated dial plate 174 is fastened adjacent slot 170 for indicating the sizes of the diaphragm openings in the various positions, respectively, of adjusting arm 172.

The optical system operates in accordance with the following principles. Light from the ribbon filament, or other lamp filament, is focused, i. e., imaged, by the concave reflecting surface 62 on to the plane face of the lens element 58. If the filament ribbon is 2 mm. wide its image at this point is between 3 and 4 mm. wide depending upon the curvature and position of the mirror surface 62. As described above, the elements 58 and 60 form an Abbe-like condensing system of power sufficient to collimate (render parallel) the light between the lenses 60 and 70. It is important to note that, since the spherical aberration and coma of the light in this collimated portion region is low because of the nature of the design described above, the lens 70 is illuminated by a collimated beam of relatively uniform intensity over its area. Lens 70 forms a real image in the plane of the field diaphragm 50 of the light imaged on the front surface of lens 58 and of the light received by said surface directly from the lamp filament. In the case of the use of the high power system of the microscope (for microscope objectives of 16 mm. or less) lenses 90 and 92 are swung into inoperative position out of the light path and lens 88 is disposed in operative position as shown in Fig. 10 with its front focal position at the field diaphragm. This serves to render parallel the light, which is then reflected upwards by the reflector 36 into the sub-stage condenser of the microscope. Since all sub-stage condensers are designed to focus parallel or nearly parallel rays on the microscope stage itself, an image of the reflected filament light and direct filament light at the diaphragm is formed at the microscope stage, the size of the image depending upon the effective focal length of the sub-stage condenser. However, the 2 mm. filament enlarged to 3 or 4 mm. at lens 58 is more than ample to cover the 16 mm. field of any microscope now in use. Since the field diaphragm 50 is at a real focus of the light on the front surface of lens 58, said diaphragm is also imaged upon the microscope stage. Furthermore, the position of the microscope is such, as determined by the position of reflector 36, that lens 88 forms an image of the evenly illuminated lens 70 in the effective aperture of the sub-stage condenser, so that the latter accepts all the light available and is evenly illuminated, for in accordance with a well known principle of stops, the image of an evenly illuminated aperture is itself reasonably evenly illuminated.

In the case of the lower power objectives of the microscope, e. g., 25 mm. or 32 mm. objectives, the lens 88 is swung out of place, to inoperative position, and the lenses 90 and 92 are moved to their operative position (Fig. 4). The lens 90 is situated approximately at the focus of lens 92 and is therefore imaged at infinity. In accordance with the previous discussion, this distant image is then focused by the microscope condenser upon the stage. Thus, what is seen upon the stage of the microscope is essentially the image of lens 92. This lens is also in a position corresponding to even illumination of its area, since it is as far from the focal position at 50 as is the evenly illuminated lens 70. Fig. 5A is illustrative of the path of the rays of light from lens 90 through lens 92 and the sub-stage condenser of the microscope to the stage of the microscope, and it will be observed by reference to Fig. 5A that light from point $p$ on lens 90 travels along the divergent rays $r1$ and $r2$ to the lens 92 which collimates the light as indicated by the parallel light rays $rc1$ and $rc2$. The parallel rays pass to the sub-stage condenser $sc$ of the microscope and are focused by the latter at the point PS at the stage of the microscope. The size S of the illuminated area on the microscope stage is then given by the expression $$S = A \times fc/fd$$

where $A$ = size of lens 90
$fc$ = focal length of sub-stage condenser
$fd$ = focal length of lens 92

The design is such that S is calculated to more than cover the field of 32 mm. objectives for all possible values of $fc$, a quantity which may vary from microscope to microscope. The light is most efficiently utilized when the image of the planar face of lens 58 formed by the low power optical train falls somewhat above the microscope stage, up toward the microscope objective, as is done in this design. It will be noted that lens 90 constitutes in effect evenly illuminated light-opening means which is located at the front focus of lens 92, and in addition said lens 90 serves to refract and thereby direct light toward lens 92.

Summarizing the above, it will be observed that when the lens 88 is in operative position, it (1) collimates the light imaged at the field diaphragm for transmission of such collimated light to the sub-stage condenser which in turn focuses the imaged light on the stage of the microscope, (2) the field diaphragm 50 is also focused on the microscope stage, and (3) an image of the evenly illuminated lens 70 is formed in the effective aperture of the sub-stage condenser. When the lenses 90, 92 are in operative position, lens 90 is evenly illuminated and the image thereof is seen on the stage of the microscope, and the size of the illuminated area on the microscope is determined by the above formula, $$S = A \frac{fc}{fd}$$

The optical system of the present invention provides a large numerical aperture of illumination at the stage of the microscope. This is accomplished as described above by providing a large numerical aperture at the front planar surface of lens 58, since this optical system including the sub-stage condenser of the microscope operates approximately at unit magnification, i. e. no magnification at the stage of the microscope of the light on the front surface of lens 58, although actual magnification of such light occurs after leaving lens 58 and before reaching the stage. When the focal length of the sub-stage condenser of the particular microscope used with the illumination is exactly equal to the focal length of the lens combination 58, 60, the system would operate at exactly unit magnification. It will be noted that the cylindrical reflector provides the high numerical aperture in horizontal planes, viewing Fig. 5, and that the high numerical aperture in vertical planes is provided by the longitudinal disposition of the lamp filament, i. e., the lengthwise disposition of the filament in the general vertical direction, viewing Fig. 4 or Fig. 3. Also, it will be observed the system of the present invention results in a true image of the light source being focused on the stage of the microscope and thus provides critical illumination of the object to be examined under the microscope.

A variable transformer (not shown) is preferably used for supplying the electric energy to lamp 44, and a voltmeter which may and preferably does have a Kelvin degree temperature scale is also provided for use with the transformer, so that for each setting of the transformer said meter indicates the color temperature of the energized filament of said lamp. Thus, the microscopist, by adjusting the transformer to provide a desired reading on said meter, can always duplicate any particular color temperature of the filament of the lamp, whether for visual examination or for photomicrography.

Thus it is seen that the microscope illuminator embodying the present invention is well adapted to accomplish the several objects thereof. It will be understood however that various changes in the details of construction and in the form and arrangement of the parts may be made without departing from the underlying idea or principles of the invention within the scope of the appended claims. Further it will be understood that although the front surface of lens 58 is described as planar, it is within the scope of this invention to employ a lens having a curved front surface. Also, it will be understood that certain features of the present invention may be used without others.

This application is a substitute for my application, Serial No. 173,372 filed July 12, 1950, now abandoned.

Having thus described my invention, what I claim and desire to secure by Letters Patent, is:

1. A microscope illuminator, comprising a first lens, means for evenly illuminating the front of said lens, a field diaphragm at the back focus of said lens, a second lens at the other side of said diaphragm, said diaphragm being located substantially mid-way between said lenses so that said second lens constitutes a light-opening lens and is evenly illuminated by the light transmitted from said first lens, and a third lens at the front focus of which said second lens is positioned for collimating the light in said opening and transmitting the same to the sub-stage condenser of the microscope, fourth lens means at the front focus of which said field diaphragm is disposed for collimating the light and transmitting it to the sub-stage condenser of the microscope, said fourth lens being movable into and out of operative positions, said second lens and said third lens being movable into and out of operative positions, and means operatively connecting said second, third and fourth lenses for conjoint movement so that said fourth lens is moved to operative and inoperative positions when said second and third lenses are moved to the inoperative and operative positions, respectively, thereof.

2. A microscope illuminator, comprising a source of light, lens means and magnifying-reflector means positioned at opposite sides, respectively, of the light source and with the front surface of the lens means at the image point corresponding to the source as the object of said magnifying-reflector means so as to provide at the light receiving side of said lens means a numerical aperture which is larger than the numerical aperture of said side of the lens means as measured from the source itself, said lens means being operative to collimate the light transmitted from the light source, second lens means for focusing said collimated light, a field diaphragm at the focal plane of the light focused by said last mentioned lens means, third lens means having its front focus at said field diaphragm for collimating the light of the image at said diaphragm and for forming an image of said second lens means on the aperture of the microscope condenser, lens means constituting light-opening means at the same distance from said field diaphragm as said second lens means but at the light-outlet side of said diaphragm, lens means at the front focus of which said light opening is positioned for collimating the light at said opening and for transmitting the same to the sub-stage condenser of the microscope, and means for automatically moving said light opening means and said last mentioned light collimating lens means to inoperative position when said third lens means is in said operative position thereof.

3. A microscope illuminator, comprising a source of light, lens means and magnifying-reflector means positioned at opposite sides, respectively, of the light source and with the front surface of the lens means at the image point corresponding to the source as the object of said magnifying-reflector means so as to provide at the light receiving side of said lens means a numerical aperture which is larger than the numerical aperture of said side of the lens means as measured from the source itself, said lens means being operative to collimate the light transmitted from the light source, second lens means for focusing said collimated light, a field diaphragm at the focal plane of the light focused by said last mentioned lens means, third lens means having its front focus at said field diaphragm for collimating the light of the image at said diaphragm and for forming an image of said second lens means on the aperture of the microscope condenser, lens means constituting light-opening means at the same distance from said field diaphragm as said second lens means but at the light-outlet side of said diaphragm, lens means at the front focus of which said light opening is positioned for collimating the light at said opening and for transmitting the same to the sub-stage condenser of the microscope, and means for automatically moving said third lens means to operative and inoperative positions and concomitantly to move said light opening means and said last mentioned light collimating means jointly as a unit to operative and inoperative positions, respectively.

4. A microscope illuminator, comprising a first lens, means for evenly illuminating the front of said lens, a field diaphragm at the back focus of said lens, a second lens at the other side of said diaphragm, said diaphragm being located substantially mid-way between said lenses so that said second lens constitutes a light-opening lens and is evenly illuminated by the light transmitted from said first lens, and a third lens at the front focus of which said second lens is positioned for collimating the light in said opening and transmitting the same to the sub-stage condenser of the microscope, fourth lens means at the front focus of which said field diaphragm is disposed for collimating the light and transmitting it to the sub-stage condenser of the microscope, said fourth lens being movable into and out of operative positions, said second lens and said third lens being movable into and out of operative positions, and means operatively connecting said second, third and fourth lenses for conjoint movement so that said fourth lens is moved to operative and inoperative positions when said second and third lenses are moved to the inoperative and operative positions, respectively, thereof, and a reflector in position along the optical axis of said illuminator at the light transmitting side of said third lens and said fourth lens in the operative positions thereof, respectively, for directing the collimated light to the sub-stage condenser of the microscope.

5. A microscope illuminator, comprising a source of light, lens means and magnifying-reflector means positioned at opposite sides, respectively, of the light source and with the front surface of the lens means at the image point corresponding to the source as the object of said magnifying-reflector means so as to provide at the light receiving side of said lens means a numerical aperture which is larger than the numerical aperture of said side of the lens means as measured from the source itself, said lens means being operative to collimate the light transmitted from the light source, second lens means for focusing said collimated light, a field diaphragm at the focal plane of the light focused by said last mentioned lens means, third lens means having its front focus at said field diaphragm for collimating the light of the image at said diaphragm and for forming an image of said second lens means on the aperture of the microscope condenser, light-opening means at the same distance from said field diaphragm as said second lens means but at the light-outlet side of said diaphragm, lens means at the front focus of which said light opening is positioned for collimating the light at said opening and for transmitting the same to the sub-stage condenser of the microscope, and means for automatically moving said light opening means and said last mentioned light collimating lens means to inoperative position when said third lens means is in said operative position thereof, and a reflector in position along the optical axis of said illuminator at the light transmitting side of said third lens means and said last mentioned light collimating lens in the operative positions thereof, respectively, for directing the collimated light to the sub-stage condenser of the microscope.

References Cited in the file of this patent

UNITED STATES PATENTS

| 1,163,192 | Adams | Dec. 7, 1915 |
| 1,630,616 | Hill | May 31, 1927 |
| 1,860,430 | Poser | May 31, 1932 |
| 1,879,737 | Del Riccio | Sept. 27, 1932 |
| 1,893,327 | Howell | Jan. 3, 1933 |
| 2,026,478 | Lisintzki | Dec. 31, 1935 |
| 2,050,860 | Rantsch | Aug. 11, 1936 |
| 2,078,586 | Richter | Apr. 27, 1937 |
| 2,144,653 | Graff | Jan. 24, 1939 |
| 2,192,886 | Bergmans et al. | Mar. 12, 1940 |

(Other references on following page)

UNITED STATES PATENTS

| | | |
|---|---|---|
| 2,195,392 | Van Alphen | Mar. 25, 1940 |
| 2,289,575 | Critoph et al. | July 14, 1942 |
| 2,311,444 | Kellogg | Feb. 16, 1943 |
| 2,347,771 | Dion et al. | May 2, 1944 |
| 2,351,736 | Benford | June 20, 1944 |
| 2,435,300 | Weiskopf | Feb. 3, 1948 |
| 2,536,866 | Barcus | Jan. 2, 1951 |

FOREIGN PATENTS

| | | |
|---|---|---|
| 16,004 | Great Britain | of 1913 |

OTHER REFERENCES

Gage, S. H.: The Microscope, published in 1932 by Comstock Publishing Co., Ithaca, New York, pages 93 and 96.